(12) United States Patent
Licon et al.

(10) Patent No.: US 7,424,478 B2
(45) Date of Patent: Sep. 9, 2008

(54) SYSTEM AND METHOD FOR SELECTING CONTENT FOR DISPLAYING OVER THE INTERNET BASED UPON SOME USER INPUT

(75) Inventors: Roberto Licon, El Paso, TX (US); Andrew Bensky, Scotts Valley, CA (US); Erik Swan, Palo Alto, CA (US); Paul Ingram, Pleasanton, CA (US); Naga Pappireddi, San Jose, CA (US); Michael D. Fox, San Jose, CA (US)

(73) Assignee: Google Inc., Mountain View, CA (US)

( * ) Notice: Subject to any disclaimer, the term of this patent is extended or adjusted under 35 U.S.C. 154(b) by 358 days.

(21) Appl. No.: 10/798,709

(22) Filed: Mar. 10, 2004

(65) Prior Publication Data

US 2004/0172381 A1    Sep. 2, 2004

Related U.S. Application Data

(63) Continuation of application No. 09/946,061, filed on Sep. 4, 2001, now Pat. No. 6,728,705.

(60) Provisional application No. 60/229,779, filed on Sep. 1, 2000.

(51) Int. Cl.
*G06F 7/00* (2006.01)
*G06F 17/00* (2006.01)

(52) U.S. Cl. ...................... 707/100; 707/102

(58) Field of Classification Search ............... 707/3, 707/9
See application file for complete search history.

(56) References Cited

U.S. PATENT DOCUMENTS

| | | | |
|---|---|---|---|
| 5,890,172 A | 3/1999 | Borman et al. | |
| 6,112,203 A | 8/2000 | Bharat et al. | |
| 6,236,987 B1 * | 5/2001 | Horowitz et al. | 707/3 |
| 6,311,194 B1 | 10/2001 | Sheth et al. | |
| 6,327,628 B1 | 12/2001 | Anuff et al. | |
| 6,446,065 B1 | 9/2002 | Nishioka et al. | |
| 6,457,004 B1 | 9/2002 | Nishioka et al. | |
| 6,567,800 B1 * | 5/2003 | Barrera et al. | 707/3 |
| 6,704,729 B1 * | 3/2004 | Klein et al. | 707/5 |
| 2001/0037359 A1 | 11/2001 | Mockett et al. | |

* cited by examiner

*Primary Examiner*—Apu Mofiz
*Assistant Examiner*—Paul Kim
(74) *Attorney, Agent, or Firm*—Fenwick & West LLP

(57) ABSTRACT

The present invention provides a method for displaying information from the Internet. In one embodiment, the invention generates a plurality of content modules, each content module comprising a subset of the content of at least one web site. The content modules are then stored in a content module data directory. When a query is received from a user, the query is assigned to at least one content module. The results of the query are displayed on two regions of the user's screen. On a first region of the user's display screen a list of information relating to the plurality of retrieved web sites is displayed. On a second region of said display screen, information from said at least one content module associated with the query is displayed.

12 Claims, 21 Drawing Sheets

FIG. 3-A

☐ Go to MyPage   Sign Out   Privacy/Saf

SEARCH ⦿All ○Images ○Audio/Video
[Britney Spears]          ⦿New Search   Sea
                   [GO]    ○Within Results  GOgu Go Back-To-School!!
Who's who on Mr. Showbiz!

GO DIRECTORY

Search>Entertainment>Music>Artists & bands>S>Spears, Britney

☐ USER RATED SITES

35 matches   Powered by
sort by: [    ]

Artist Bios by Wall of Sound

[▢] Britney Spears BRITNEY
    JEAN SPEARS was born
More by   Dec. 2, 1981, in....
PicturesNow
          Albums
          News Today: Tuesday
          August 29,2000
          Christina, Sisqo to Play
          Video Music Awards
          More on Britney Spears ☐ Britney Spears Fan Club ▢▢▢
Touring schedule, photo gallery, discography, lyrics,
Webrings, links and chat.
Last reviewed by VolkertV
http://www.britneyspearsfan.com/

Got Milk?

[▢]  Don't give it to your
     Cats are sensitive critters
     who need a balanced and
     healthy diet. Don't kill
     with kindness!
milk can cause
digestive        [    ]  [S]
problems in cats ☐ Britney Spears: Official Website ▢▢▢
Official Britney Spears homepage offering images,
electronic postcards, merchandise and more.
Last reviewed by jhawkins2000
http://www.britneyspears.com/

Album Reviews by Wall of Sound

[▢]  Britney Spears
     Oops!...I Did It Again
     Jive

☐ Britney Zone ▢▢▢▢
Offers photographs, audio and videos. Also has news,
contests, forum, games, and chat.
Last reviewed by pwnorm
http://www.britneyzone.com/

☐ 001Pic.com: Britney Spears ☐☐☐
Offers pictures, audio and videos. Also has Britney puzzle games, screen saver, and britney web popularity info.
Last reviewed by jerrymon44
http://www.001pic.com/BritneySpears/
☐ Adorable Britney Spears ☐☐
Britney Spears biography, discography, lyrics, pictures galleries and links to other Britney sites.
Last reviewed by sthenbelle05
http://www.britney-spears.nm.ru/

The message here is not subtle nor hard to disconnect her...

Req

Next 10>

☐ WEB SEARCH RESULTS ☒

26,388 matches    Powered by
Hide summaries | Sort by date | Ungroup results

Save up to 70%!
• Big Deal of the Day
• Electronics
• Bargaineers Club

☐ Britney Spears—Go there directly with this Internet Keyword by RealNames.

1. Peeps.com: Britney Spears
Official site has Britney's biography, photos, interview in audio or video, and fan club info.
Relevance 93% Date 28 Jul 1999, Size 1.6K
http://www.peeps.com/britney/
Find similiar pages | More results | Translate this page Audio/Video from Listen.com
Britney Spears
Already a pop singer of fabled proportions teen queen of the marketing tie-in, Britney was groomed for pop st 2. Britney Spears Organization
Stylish site pays tribute to Spears with a biography, a message board, a discography, a fan club, and more.
Relevance 92% Date 22 Oct 1999, Size 7.2K
http://www.britneyspears.org/
Find similiar pages | Translate this page GO Shopping
Shop for what you want!
• Search for britney spears
• Shop by Product
• Utilize the Buyer's Guides
• See Merchant Ratings
• Use GO Shopping's Advance Search 3. Wall of Sound: Britney Spears
Biography, discography, CD review and news.
Relevance 90% Date 6 Oct 1999, Size 15.4K
http://wallofsound.go.com/artists/britneyspears/h...
Find similiar pages | Translate this page Look in GO S

FIG. 3-B

4. Britney Spears: The Official Britney Spears Website
The Official Britney Spears Website provides extensive information about the teen music sensation, from her southern belle upbringing in Louisiana, to her days as a chipper Mouseketeer and her current...
Relevance 87% Date 13 Aug 1999, Size 10.6K
http://www.officialbritney.com/
Find similar pages | Translate this page 5. Britney Spears Fan.com
Touring schedule, photo gallery, discography, lyrics, Webrings, links and chat.
Relevance 86% Date 9 Sep 1999, Size 14.5K
http://www.britneyspearsfan.com/
Find similar pages | Translate this page Next 10>

☒

Check Out the GO Shop

| | | | |
|---|---|---|---|
| GO.com Partners: | ABC.com ABCNEWS.com | Disney.com ESPN.com | Family.com Movies.com | Mr. Showbiz Wall of Sound |

GO.com Information: Add a URL About Our Company Jobs Write to Us
GO.com Affiliate Terms of Service
Copyright © 2000 The Walt Disney Company, GO.com. All Rights Reserved.

☐ Go to MyPage  Sign Out  Privacy/Saf

SEARCH ○All ○Images ○Audio/Video bridge

● New Search
○ Within Results

GO  Sea
GOgu

Catch the coin for a chance at $20,000!

(iwin)

Go Back-To-School!
Who's who on Mr. Showbiz!

FOCUS YOUR SEARCH
You searched for bridge.

Did you mean:
Music artists & bands
Bridges
Video games
Bridge card game
Bridge on the River Kwai, The
Covered bridges
Bridges, Jeff
Bridges, Harry
Nash Bridges
Computer programming None of those apply.
Just search for bridge GO.com       ABC.com        Disney.com     Family.com      Mr. Showbiz
Partners:    ABCNEWS.com    ESPN.com       Movies.com      Wall of Sound GO.com Information: Add a URL  About Our Company  Jobs  Write to Us
GO.com Affiliate Terms of Service
Copyright © 2000 Disney Enterprises, Inc. All Rights Reserved.

FIG. 5-A

☐ Go to MyPage  Sign Out  Privacy/Saf

SEARCH ⦿All ○Images ○Audio/Video
[Bridge on the River Kwai,]

All sports, all the time!
Wanna be a Millionaire?

⦿ New Search
○ Within Results

Click on the 33 for a chance to win $1,000,000

(33) (88) (16) (78) (52) (9)   [GO]

GO DIRECTORY
GO Home>Entertainment>Movies>By title>B>Bridge on the River Kwai, The Movie Spotlight, from Mr. Showbiz ☒ The Bridge on the...

The Bridge on the River Kwai
1957

Stars: Read review
Director:
Summary: An engro action-adventure story   Read

PROVEN PICKS    Powered by [____]
11 matches   [____] :users like you
☐

☐ Classic Movies: Bridge Over the River Kwai
Movie poster, awards, cast and crew information, reviews, moments and scenes, multimedia, photo and poster gallery.
Last reviewed by: SurfLearn
http://www.geocities.com/Hollywood/9766/kwai.html ☐ ApolloGuide: Bridge Over the River Kwai
Summary, review, links, movie matches, actor credits, director and trailer links.
Last reviewed by: SurfLearn
http://apolloguide.com/mov_revtemp.asp?Title=Bridg...

☐ BritMovie: Bridge Over the River Kwai
Production team, cast, plot synopsis and filming tidbits about the classic war epic.
Last reviewed by: SurfLearn
http://www.britmovie.co.uk/directors/d_lean/filmog...

Find Movie Times, from Movies.com
When's the movie start? Check times by typ movie name and your zip code.
Movie Names [____]
Your Zip Code (or City, State) [____]

FIG. 5-B

☐ Hartwick.edu: Bridge Over the River Kwai
Film poster with Hartwick Classic Film Leadership
Case study based on the film, which is based on Pierre
Boulle's novel.
Last reviewed by: SurfLearn
http://www.hartwick.edu/hhmi/cases/riverkwai.htm ☐ At-A-Glance: Bridge Over the River Kwai
Sam and Dean discuss aspects of the film and other
reviews of it.
Last reviewed by: SurfLearn
http://www.rinkworks.com/movies/m/the.bridge.in.th...

Next 6>

Become a GO Guide to help us build a better directory.

☐ WEB SEARCH RESULTS  ☒

31,075,903 matches Powered by ☐

Show details | Sort by date | Ungroup results
GO.com: Your Page for "Bridge on the River Kwai, The"

1. Farmingon Library
Farmington Library
http://connect.crlc.org:1092/

2. The Flick Filosopher | The Bridge on the River
Kwai
Instantly one of my favorite films, The Bridge on the
River Kwai is a tense, terrifying, absolutely riveting
film about the ironies of war and the deadly
psychological games enemy...
http://www.flickfilosopher.com/oscars/bestpix/riv...

3. Bridge on the River Kwai Plot
One of "Bridge on the River Kwai" web pages. Part of

- Summer Specials!
- Summer Necessities
- Great Getaways!
- Summer Blockbusters

See Movie Reviews by Mr. Showbiz

- Bring It On (PG-13)
  Kirsten Dunst and Eliza Dushku have...
  (77/100)

- The Art of War (R)
  There's definitely no art to Wesley... (29/1

- The Crew (PG-13)
  Geezer goombahs run amok in Miami's...
  (36/100)

More Rev the 'History in Film' web site. Includes plot, outlines, worksheets and screen photos.
http://www.historyinfilm.com/kwai/plot.htm 4. The Bridge On The River Kwai (1957)
Memorable Moments from Great Movies! Great Moments and Scenes from Memorable Movies! Great Lines and Quotes from the Movies! Great Movies with Great Dialogue! Great Stars and Great Characters in Great...
http://www.filmsite.org/bridge.html 5. Bridge on the River Kwai, The
The Bridge on the River Kwai Mark R.. Starting with The Bridge On the River Kwai, I will begin reviewing "oldies but goodies." As I work in a video store, I cringe when garbage new...
http://www.projectorbooth.com/reviews/rewind/brid...

Next 10>

| Click on the 33 for a chance to win $1,000,000 |
| (33) (88) (16) (78) (52) (9) |

Check Out the GO Shop

| GO.com Partners: | ABC.com ABCNEWS.com | Disney.com ESPN.com | Family.com Movies.com | Mr. Showbiz Wall of Sound |

GO.com Information: Add a URL About Our Company Jobs Write to Us
GO.com Affiliate Terms of Service
Copyright © 2000 Disney Enterprises, Inc. All Rights Reserved.

☒ SEARCH ⦿All ○Images ○Audio/Video
[bridges]                               ☒

Go Back-To-School!      ☐ Go to MyPage  Sign Out  Privacy/Saf
Who's who on Mr. Showbiz!
                        [GO] ⦿New Search          Sea
                             ○Within Results      GOgu
GO DIRECTORY            [            ]

Search>Travel>Vacation ideas>Tourist
attractions>Bridges     Travel Vacations

Bridges                 Find the perfect getaway
Covered bridges
                        • Beach vacations
☐ USER RATED SITES      • Find a Resort
                        • Disney World Vacations
6 matches    Powered by [    ]  • Bed & Breakfast Search
sort by: [    ]
         [    ]                          More vacations
         [    ]

☐ Bridges of Portland, Oregon
Photos and descriptions of the bridges that span the
Columbia and Willamette rivers in Portland, Ore.
Last reviewed by traveler112
http://www.bizave.com/portland/bridges/       Got Milk?    Don't give it to your
                                                           Cats are sensitive critters
☐ Golden Gate Bridges: San Francisco           ☒           who need a balanced and
History, photos and an FAQ about this historic San         healthy diet. Don't kill
Francisco bridge.                                          with kindness!
Last reviewed by traveler112                   milk can cause  [S]
http://www.goldengate.org/                     digestive
                                               problems in cats
☐ Historic Bridges of Oregon
Site offers links to information and photographs of many   Disney Vacations
of the state's historically significant bridges.
Last reviewed by traveler112                   ☒
http://www.odot.state.or.us/eshtm/br.htm
                                               • Disney Vacations Home

FIG. 6-B

☐ Royal Gorge Bridge: Colorado
World's highest suspension bridge, spanning the
Arkansas River at a height of 1,053 feet. Site includes
photos, history and visitor information.
Last reviewed by traveler112
http://royalgorgebridge.com/

☐ Good Bridge News
Information and local news coverage concerning the
Ringling Causeway Bridge.
Last reviewed by brooks18
http://www.thegoodbridge.com/

☐ WEB SEARCH RESULTS  ☒

703,234 matches    Powered by: [    ]        Next 1>

Hide summaries | Sort by date | Ungroup results

1. New Hampshire's Covered Bridges
Complete listing and brief descriptions of all 54 of NH's
Covered Bridges.
Relevance 71% Date 9 Jul 1999, Size 9.1K
http://www.nhweb.com/travel_guide/covered_bridges...
Find similar pages | Translate this page 2. DOE Information Bridges
Full-text DOE research and development reports in
physics, chemistry, materials, biology, environmental
cleanup, energy technologies, and other topics.
Relevance 71% Date 5 Feb 1999, Size 1.1K
http://www.doe.gov/bridge/
Find similar pages | More results | Translate this page 3. Bridge World Home Page
Online home of Bridge World magazine. Includes an

- Walt Disney World
  Vacations
- Disneyland Vacation
- Disney Cruise Line
  Vacations
- Disney Theme Park More Disney

- Save up to 70%!
- Big Deal of the Day
- Electronics
- Bargaineers Club

☒

Travel Reservations

- Air
  Book a flight
- Car
  Rent a car
- Hotel
  Reserve a hotel room

Travel Destinations

Where are you going? Find country profiles
first choosing a continent.

[ Africa        ▽ ]

FIG. 6-C introduction to the game, a practice area, and bridge references.
Relevance 71% Date 22 Apr 1999, Size 4.5K
http://www.bridgeworld.com/
Find similar pages | More results | Translate this page 4. American Contract Bridge League
Features tournament info, locations of bridge clubs around the world, online bridge play, laws of duplicate bridge, sales catalog, and more.
Relevance 71% Date 4 Oct 1999, Size 8.5K
http://www.acbl.org/
Find similar pages | More results | Translate this page 5. Bridge Webring
Links to bridge-related sites on the Internet.
Relevance 70% Date 3 Jan 1999, Size 5.8K
http://www3.ns.sympatico.ca/david.positronic/ring
Find similar pages | Translate this page Travel Resources
- Plan trips with friends
- Get a map
- Buy travel essentials
- Translate a phrase
- Check the weather Look in GO S Next 10>

    Check Out the GO Shop

GO.com       ABC.com        Disney.com     Family.com     Mr. Showbiz
Partners:    ABCNEWS.com    ESPN.com       Movies.com     Wall of Sound
             GO.com Information: Add a URL  About Our Company  Jobs  Write to Us
             GO.com Affiliate Terms of Service
             Copyright © 2000 The Walt Disney Company, GO.com. All Rights Reserved.

FIG. 7-A

☒ SEARCH ⊙All ○Images ○Audio/Video      ☐ Go to MyPage  Sign Out  Privacy/Saf
   [loza12]                               [GO]  ⊙New Search
All sports, all the time!                       ○Within Results
Wanna be a millionaire?

☒                                    ☒

☐ USER RATED SITES

Powered by [        ]              What Do You Want to See Here?
                                   loza12
There are currently no Go Guides available for this    Welcome! Please help GO.com give you more
topic.                             what you want. Tell us what you are hoping
Become a Go Guide!                 for this search topic.

Tell us here>

☐ WEB SEARCH RESULTS  ☒

3 matches          Powered by: [    ]       Play that funky music!

Hide summaries | Sort by date | Ungroup results    ☒         And if you can't play,
                                                              ahead and listen! Check
1. Eagles Game Stats                                         some of these great artists.
ESPANOLA SCREAMING EAGLES JUNIOR "A"       Heavenly music at
HOCKEY THE SCREAM: Eagles Commentaries     the Wall of        • Sting sans The Police
Regular tickets Adults $6.00 Student $4.00 SEASON  Sound!     • Blaine loves Led Zeplin
TICKETS Adult  $110.00....                                    • Goo Goo Dolls-
Relevance 30% Date 13 Mar 2000, Size 79.8K                      overhyped, but still
http://www.etown.net/eagles/goal_scored.html                  • Our own Kristina's from
Find similiar pages | Translate this page                       Nine Inch Nails
                                                              • Aussie soap opera song
2. Programa-9 de Octubre                                        Natalie Imbruglia
SABADO 9 DE OCTUBRE 12:00 hrs SALA 3 Camino
a casa Diente de leche. 1999. Javier Patron. 13:46 min,              Watch video
Casting. 1999. Nela Fernandez. 15:23 min. Los perros
patinadores. 1999. Fernando Rueda. 13:22min.La...
Relevance 29% Date 23 Feb 2000, Size 19.1K
http://www.givenet.org/cinefest/programa_09.htm
Find similiar pages | More results | Translate this page       GO Express Search

FIG. 7-B

FIG. 9
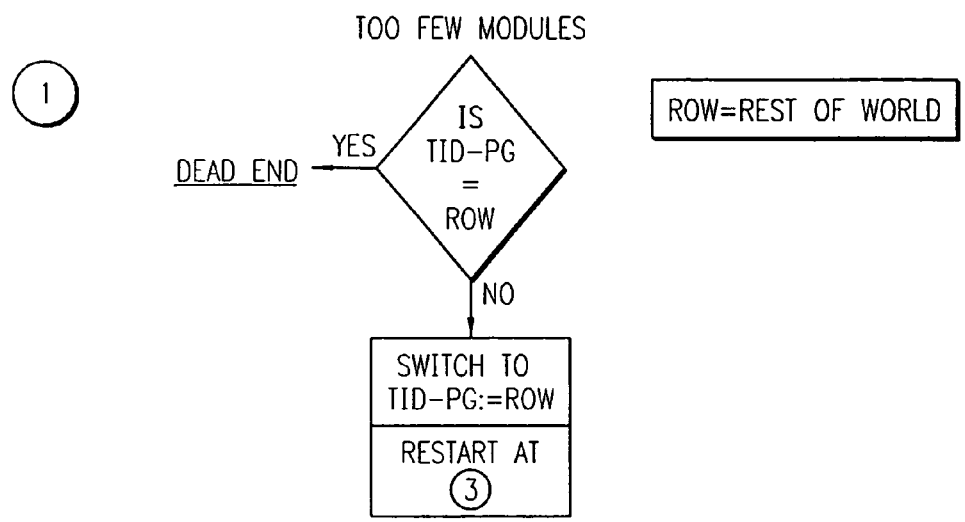
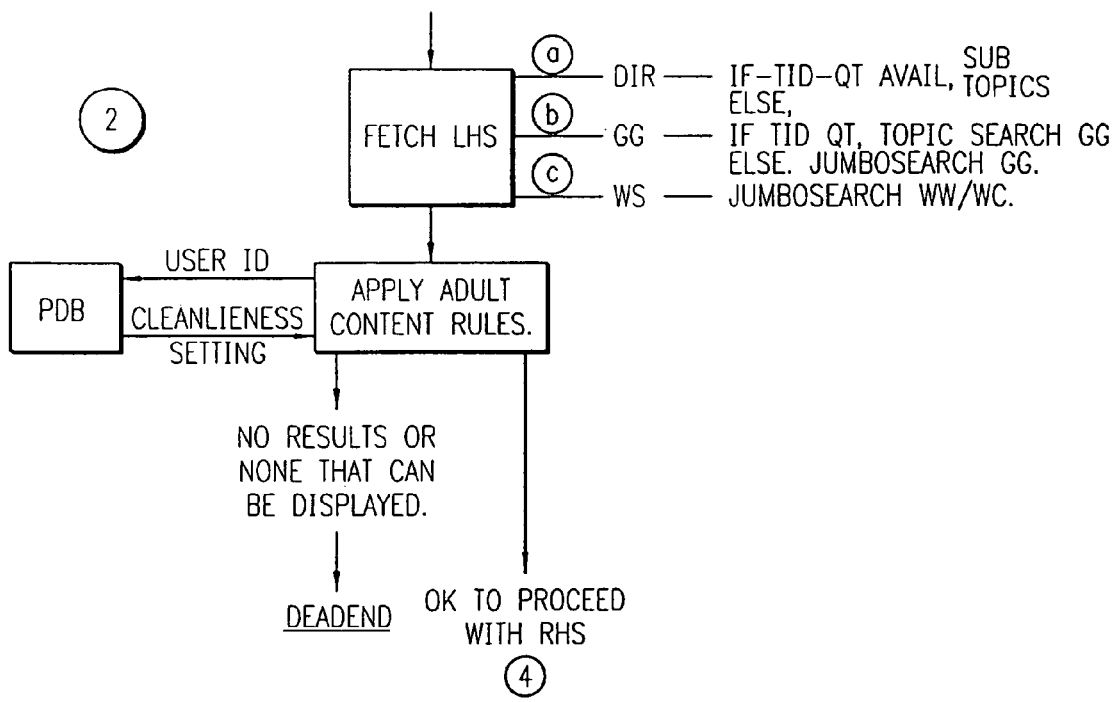

FIG. 11

<u>DEADEND</u>  CAUSE DEPENDENT:
    a) LHS RELATED WARNINGS-SHOW APPROPRIATE ERROR PAGE
                               eg. ADULT, 500 HITS, NO GT,
                                     NO RESULTS IN NEITHER AH OR WS
    b) TOO FEW MODULES-SHOW ONLY LHS PAGE.

(5) <u>OK TO CONSTRUCT PAGE.</u>

(e.g. M83 ⇒ /REAL/MODULES/FRAGS/M_00083.FRAG)

DETERMINE PAGE & MODULE FRAG NAMES FROM CONF. FILE PRESENTATION CONF.

DRAW HEADER

DRAW LHS

DRAW RHS MIX AD MODULES AS PER PAGE AD SLOT RULES (PLACE HOLDER FOR ADS)

DRAW FOOTER

WRITE TO A FILE

AD SERVER ← AD TYPE(S) / QT / ADS → FOR ALL ADS REFERENCED, MAKE A COMBINED TRIP TO ADSERVER TO FETCH AD HTML (4) eg. AD TYPE-"BANNER", "TEXT-1" "TEXT-2" "AD MODULE" "HALFBANNER"(?), DINE.

PAGE DESC

| PAGE TYPE NAME-MEMO | | | | | |
|---|---|---|---|---|---|
| MIN/MAX MODULE RULE | | | | | |
| AD SLOTS-POSITION FRR AD MOD, AD HALF BANNER | | | | | |
| MODULES-MOD | | | | | |
| A | MOD ID | TID OVERRIDE | NAME | MAX RU | MODULE'S BRIAN VIEW NAME |
| B | 163 | TO | M28 | 2 | |
| C | | | | | |
| | (LOOK + CONTENT TYPE) | | (LOOK) | | |
| | (BIO) | | (PIC + 2 LINES) | (HOX GENETIC TO GO) | |

Ⓐ

Ⓑ = Ⓐ + TICK URL

FOCUS YOUR QUERY   WHEN GIVEN QT
             KW RETURNS >1 TID.-QT

USING PREMOTE TOPIC FOR "ONTOLOGY"

FIG. 15

BETTER NAMES:

DMT —— DIRECTORY MANAGEMENT TOPIC
BRIAN —— CODE NAME FOR ONTOLOGY DB/ARCHITETURE
MAT —— MODULE ADMISTRATION TOOL
CDGM —— FASTER LOOKUP DATABASE
KEYWORD —— MAPPING USER QUERY TO UNIQUE WORD(S)
SP —— SERVICE PROVIDER CONTENT PARSER OF CONTENT TO XML
TID —— TOPIC ID
QT —— USER TYPED TEXT
KW —— KEYWORD SERVICE
ROW —— REST OF THE WORLD
RDIST —— DISTANCE IN THE ONTOLOGY TREE TO FIND CONTENT
PDB —— PERSONALIZATION DATA BASE
TICK —— TRANFERING INFORMATION
      (a) CHEAPLY AND KWICKLY
      (b) (CONTET CACHEING SERVER)
MERGE —— CONTENTMERGE OF DIFFERENT XML TEMPLATED CONTENT.
LHS —— LEFT HAND SIDE
RHS —— RIGHT HAND SIDE
MODULE —— A UNIT OF HTML PRESENTATION.
XS —— EXTENDED KEYWORD SERVICE. (ALTERNATIVE LOOKUP TABLE)

SYSTEM AND METHOD FOR SELECTING CONTENT FOR DISPLAYING OVER THE INTERNET BASED UPON SOME USER INPUT

RELATED APPLICATIONS

This application is a continuation of U.S. patent application Ser. No. 09/946,061, now U.S. Pat. No. 6,728,705 filed Sep. 4, 2001, which claims the benefit of provisional Application No. 60/229,779, filed Sep. 1, 2000, the contents of which are both incorporated herein in their entirety.

BACKGROUND

1. Field of Invention

This invention relates generally to a system and method for selecting content for displaying over the Internet based upon some user input. Particularly, this invention relates to a system and method of selecting content from a content directory for display in a web-page where the content is based upon some arbitrary user input.

2. Background of the Invention

In recent years, web-pages, and other Internet components have changed to incorporate the popularity of customizable, interactive, and dynamic structure. Most existing web-pages contain pre-specified content, where a user simply downloads the source code of the desired page for viewing in an Internet browser. Some web-pages may have limited dynamic components and may offer limited customizability. For example, existing web pages may allow a user to make certain custom settings to a web-page. However, the user is usually prompted for specific information, and has a limited number of choices. A need still exists for a system and method capable of generating and displaying content in a web-page, based upon some arbitrary input by a user.

SUMMARY

The invention disclosed herein is a novel approach which addresses many of these limitations. A general feature of the present invention is to provide a system and method for displaying content over the Internet, based upon some arbitrary user input. The content may include, but is not limited to web content such as pictures and/or links and/or functional programs and/or tables and/or charts and/or functions etc.

The present invention provides a method for displaying information from the Internet. In one embodiment, the invention generates a plurality of content modules, each content module comprising a subset of the content of at least one web site. The content modules are then stored in a content module data directory. When a query is received from a user, the query is assigned to at least one content module. The results of the query are displayed on two regions of the user's screen. On a first region of the user's display screen a list of information relating to the plurality of retrieved web sites is displayed. On a second region of said display screen, information from said at least one content module associated with the query is displayed.

One feature of the present invention is to maintain a directory of web-page content modules and to algorithmically traverse the directory, based upon some user input, to synthesize content for a web-page.

A module as used herein may be a discrete chunk of content so that combining one or multiple modules will in effect synthesize part or all of the content of a web page. For example, a user may issue as input the word "dolphins" and the invention will dynamically create a web page with various content modules related to dolphins. The exemplary method of the invention may traverse the directory containing the content modules and obtain modules which exactly correspond to the keyword "dolphins" if such modules exist in the directory. For example, the traversal may obtain content modules with pictures and links to dolphin shows. Alternatively the invention may obtain modules that do not directly correspond to the keyword "dolphins," but are related to keyword, if such modules exist in the directory. For example, the directory traversal may obtain content modules related to marine mammals.

DRAWINGS

FIG. 3 discloses a possible resulting web page from user input of "Britney Spears".

FIG. 4 discloses a possible resulting web page from user input of "bridge".

FIG. 5 discloses a possible resulting web page from a user selection of "Bridge on the River Kwai, The".

FIG. 6 discloses a possible resulting web page from a input of "bridges".

FIG. 7 discloses a possible resulting web page from a user input of "Ioza12".

Figure 1:
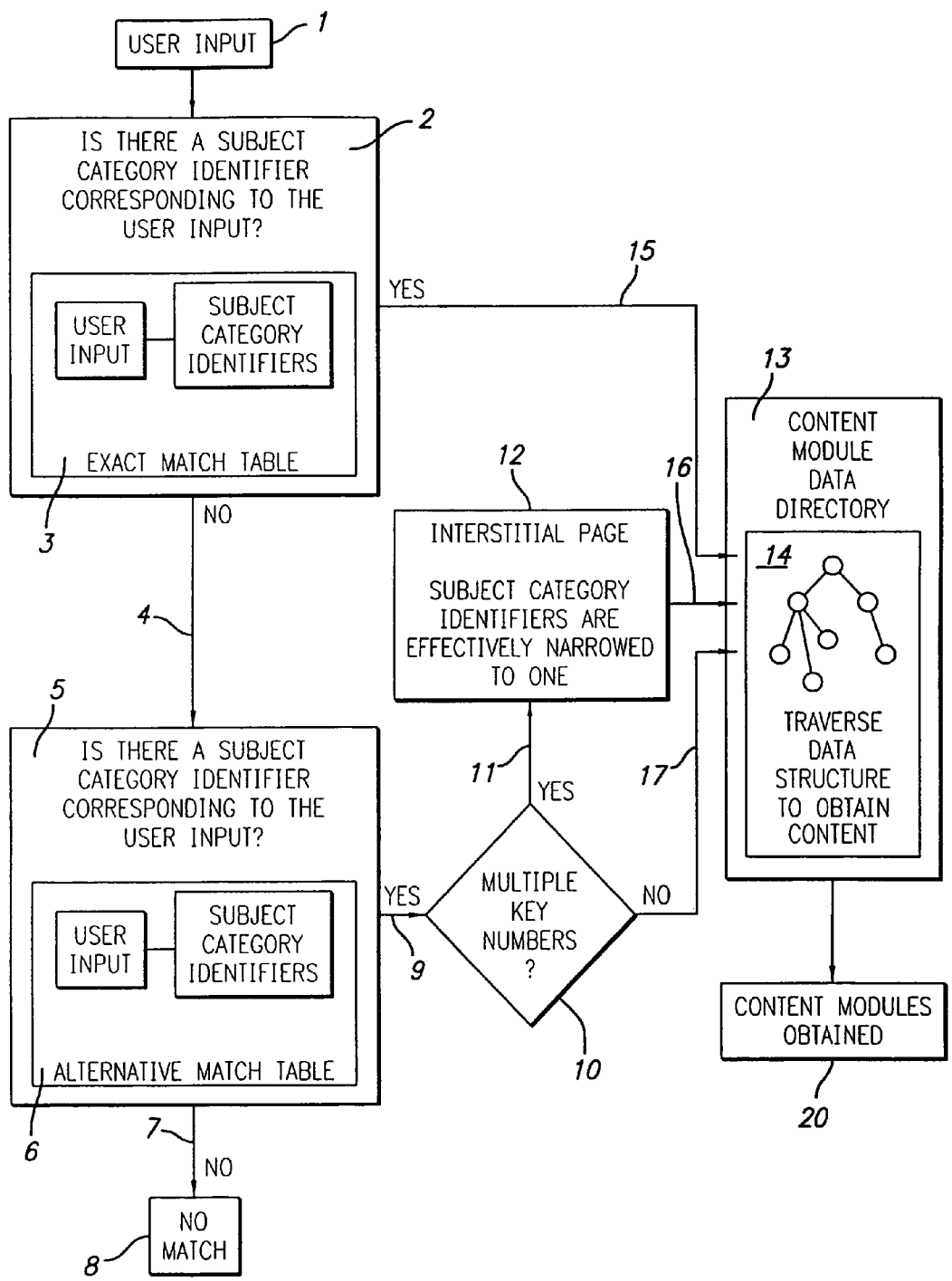
FIG. 1 is an exemplary method diagram in accordance with one embodiment of the present invention, which illustrates by way of example a flow chart that represents a functional algorithm for generating content for display over the Internet based upon some user input.
Figure 8:
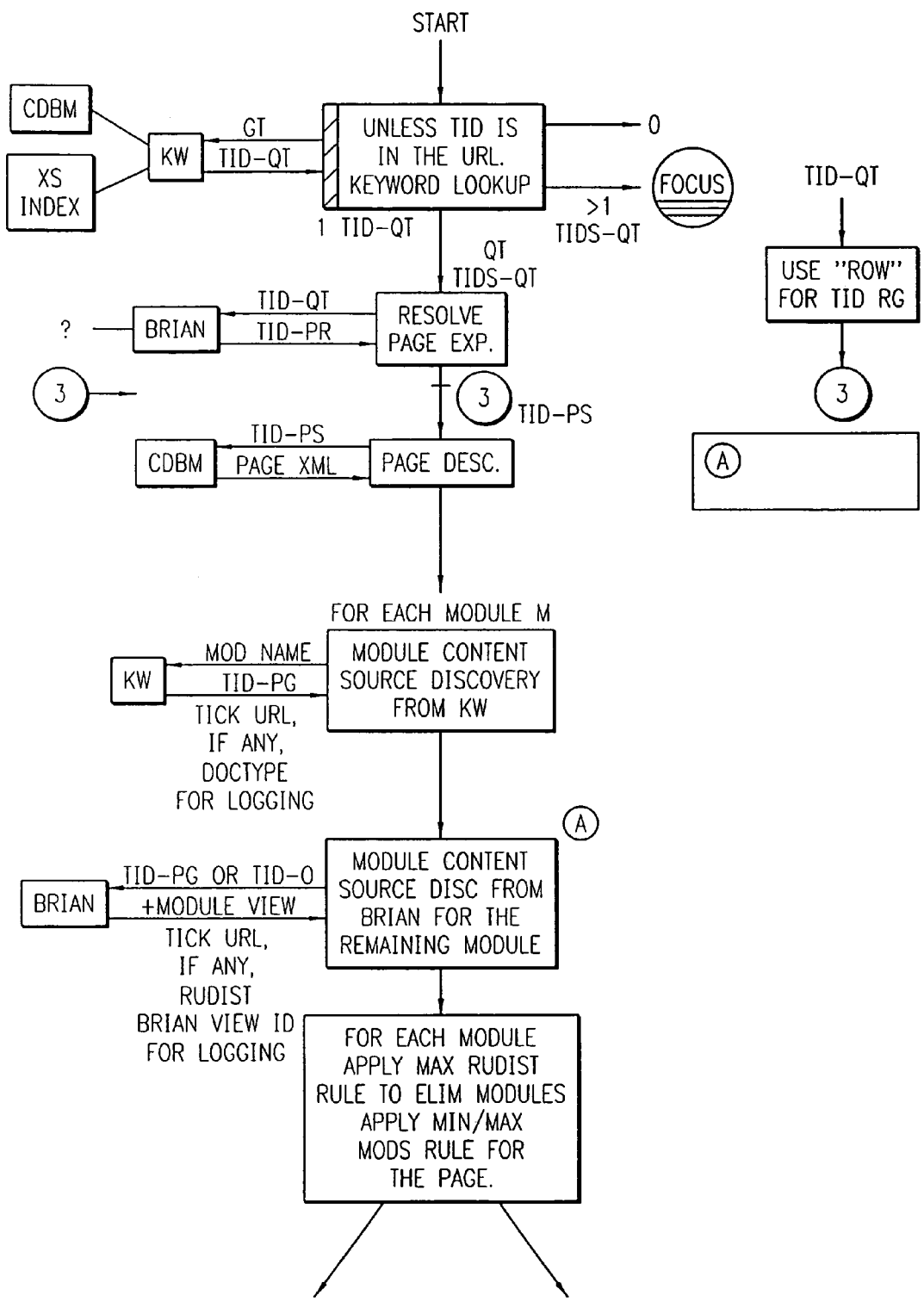

FIG. 8 discloses part of the embodiment represented by FIG. 1; namely a detailed description of the communication channels 1-17.

FIG. 9 discloses part of the embodiment represented by FIG. 1; namely, scenarios of the traversal of the data structure 14.

Figure 10:
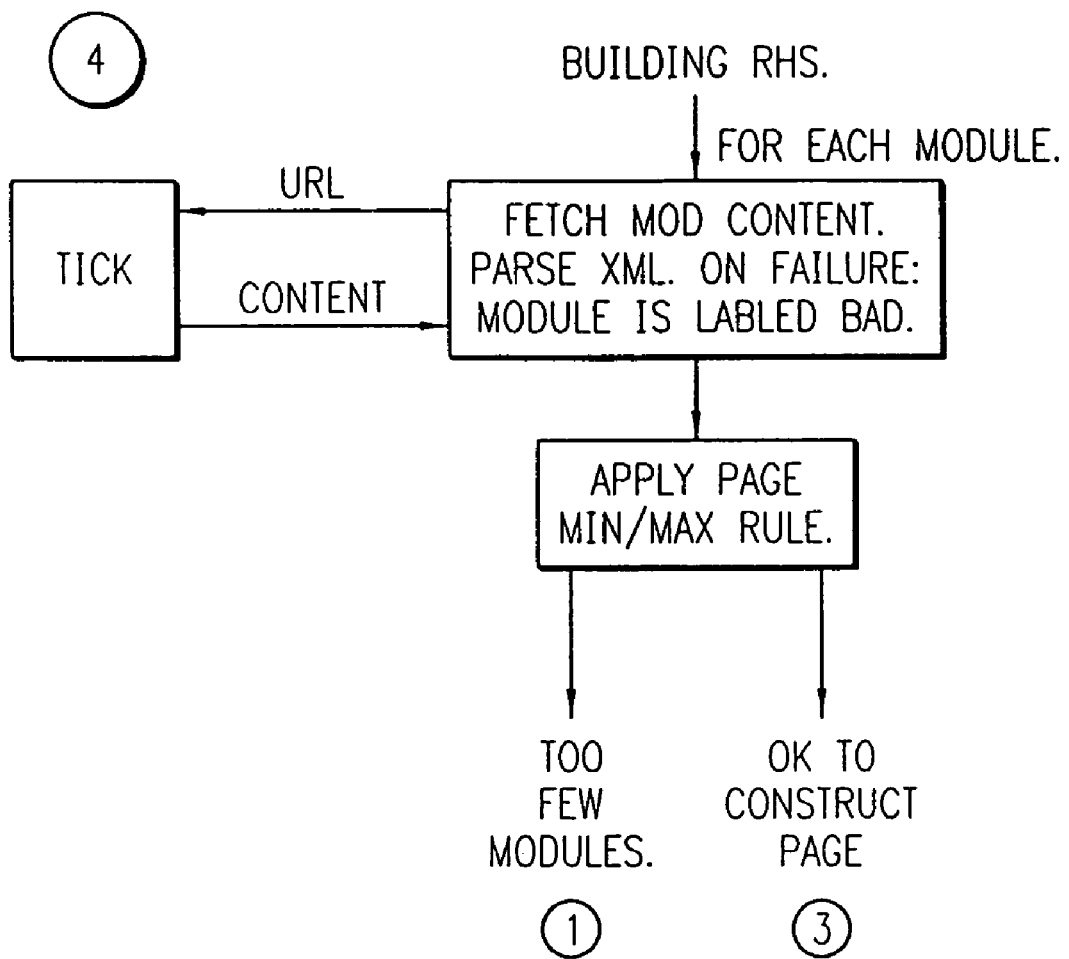

FIG. 10 discloses part of the embodiment represented by FIG. 1; namely obtaining content from each node during the traversal 14.

FIG. 11 discloses part of the embodiment represented by FIG. 1; namely additional checks after the content is retrieved 20.

Figures 12, 13:
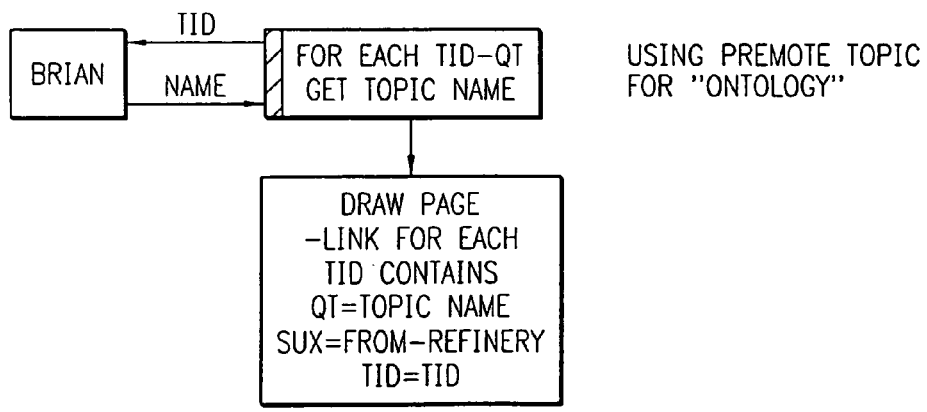

FIG. 12 discloses the format of the page description.

FIG. 13 discloses part of the embodiment represented by FIG. 1; namely the interstitial page 12.

Figure 14:
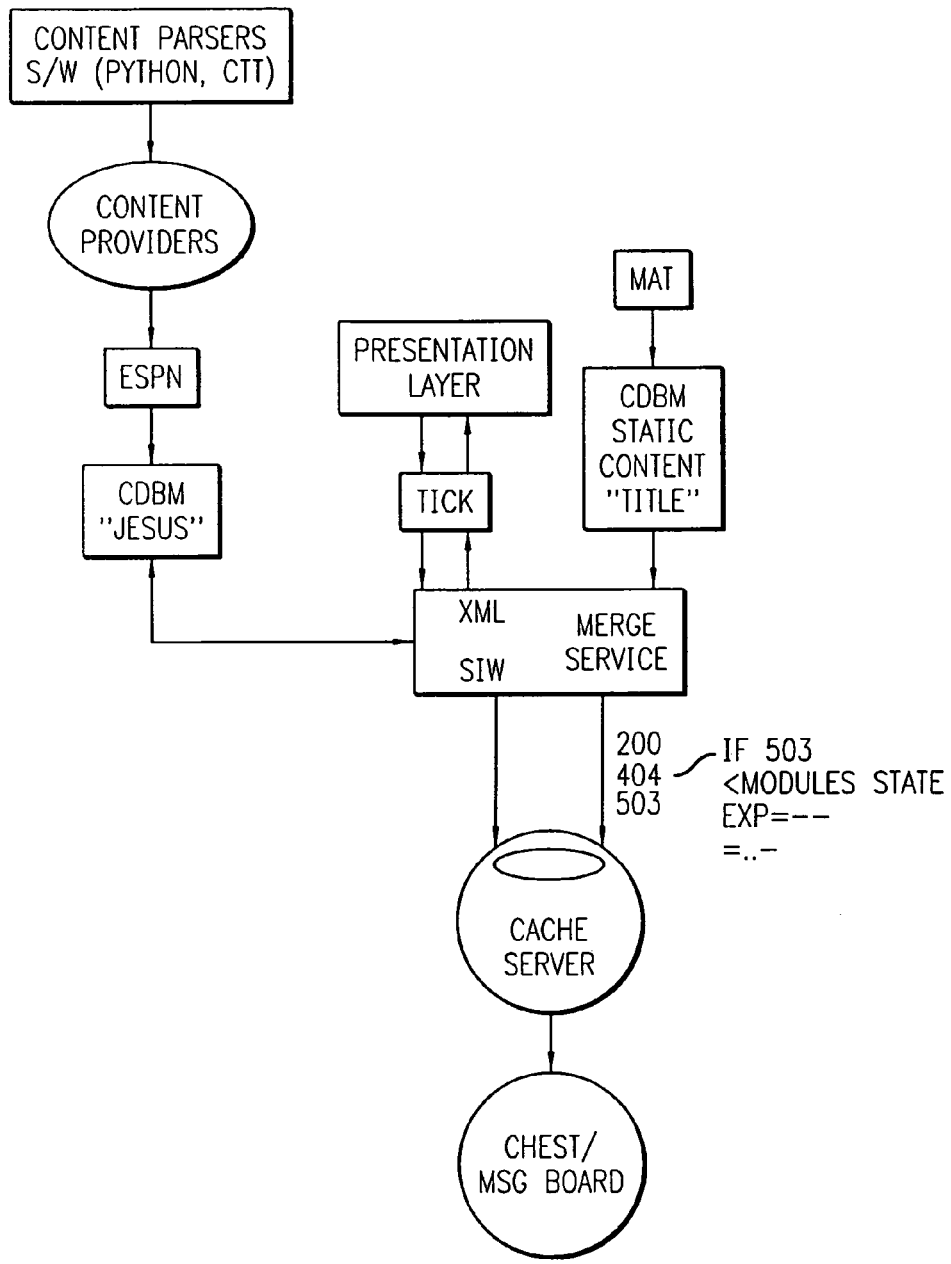

FIG. 14 discloses part of the embodiment represented by FIG. 1; namely the data structure 14.

FIG. 15 is a list of acronyms referenced by FIGS. 8-14.

DESCRIPTION

This description is not to be taken in a limiting sense, but is made merely for the purpose of illustrating the general principles of the invention. The section titles and overall organization of the present detailed description are for the purpose of convenience only and are not intended to limit the present invention. Accordingly, the invention will be described with respect to a ontology content directory data structure which is a data tree. It is to be understood that the particular data structure described for the ontology directory herein is for illustration only; the invention also applies to other data structures and combinations of other data structures. For example, linked lists, heaps, deaps, hash tables, directories etc. Also, the invention may apply to numerous types of each of these data structures, such as binary search trees, 2-3 trees, 2-3-4 trees, red-black trees, m-way search trees, b-trees, digital search trees, k-dimensional trees, min-max heaps, binomial heaps, f-heaps, etc., individually and/or collectively.

The invention may also be run on multiple computer hardware and software platforms. For example, Intel/AMD based systems, Sun Microsystems, Silicon Graphics, IBM RS/6000, IBM AS/400, Macintosh, Windows, Unix, etc. The invention may also encompass various internet technologies such as Java applets, active servers, xml, html, dynamic html, Active X, Java script, etc. The invention may be written in a number of computer languages, such as, C/C++, Java, Perl, Java script, Lisp, Visual Basic, etc., individually or collectively. The resulting web page may be viewed on various browsers such as Netscape Navigator, Internet Explorer, and/or various document editors such as Microsoft Word, Word Perfect etc.

Displaying Content over the Internet Based Upon Some User Input

FIG. 1 illustrates by way of example a flow chart that represents a functional algorithm for generating content for display over the Internet based upon some user input. In this embodiment of the present invention, a user on a client system first sends a query to a server system (1). This query may be any textual input and/or keyword and/or phrase and/or search term etc.

Generating a Subject Category Identifier

Figure 2:
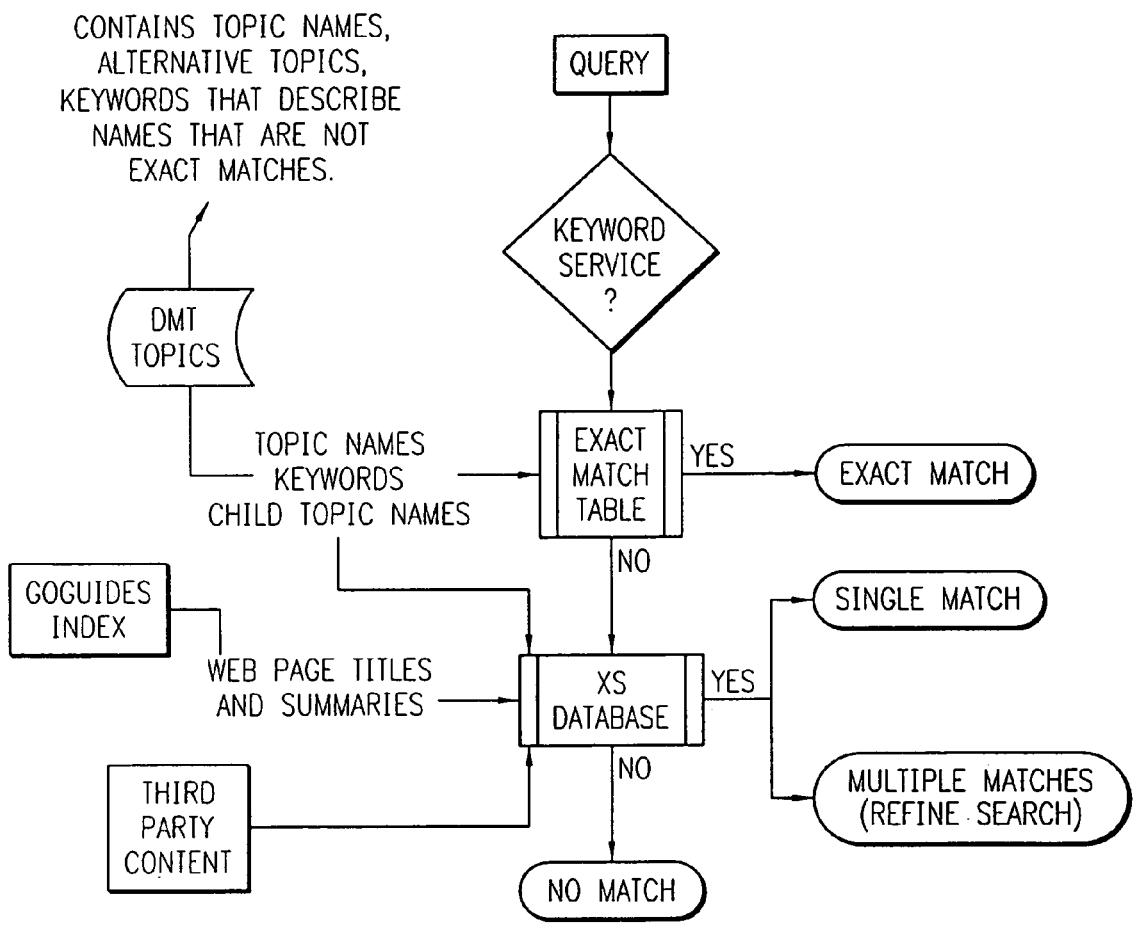
FIG. 2 is an exemplary method diagram in accordance with one embodiment of the present invention, which illustrates by way of example a flow chart that represents a functional algorithm for generating identification numbers for associating with nodes in a data directory.

The query is then algorithmically associated with a subject category identifier (shown in steps 1-12). In general, there may be four possible outcomes of the first pass of the algorithm: first, a single subject category identifier is obtained which is an exact match to the user input (15); second, a single subject category identifier is obtained which is an alternative match to the user input (17); third, multiple subject category identifiers are obtained which are alternative matches to the user input and the algorithm narrows the subject category identifiers to one (16); fourth no subject category identifier is found (7). FIG. 2 discloses another embodiment of generating the subject category identifiers (15, 16, 17, 7 on FIG. 1).

Subject category identifiers associated with user input may be stored in two different tables; namely, an exact match table (3) or an alternative table (6). First, the algorithm checks the exact match table (2, 3) to determine if there is a subject category identifier that corresponds to the query. The subject category identifiers in the exact match table correspond to nodes in the content module data directory (13) directly relating to the user input. For example, if the user input is "dolphins" and the algorithm obtains a subject category identifier in the exact match table (3), the respective node in the data directory (13) associated with that subject category identifier may contain a content module directly relating to dolphins. Furthermore a subject category identifier obtained from the exact match table (3) may indicate the starting node point for traversing the content module directory (14) and determine the algorithm for traversing the data directory for additional content modules. If no corresponding subject category identifier is found in the exact match table for some user input (4), the algorithm checks the alternative table to determine a subject category identifier that corresponds to the query (5, 6). If a single subject category identifier in the alternative table is found associated with the user input (9, 10, 17), then this subject category identifier is used for the directory traversal for obtaining content modules (14). The subject category identifiers in the alternative match table correspond to nodes in the content module data directory (13) relating to the user input and may indicate the starting node point for traversing the content module directory (14) and determine the algorithm for traversing the data directory for additional content modules. If a plurality of subject category identifiers are found (9, 10, 11) associated with the user input the algorithm may provide the user a choice of different query options to narrow the subject category identifiers to one (12). After the user makes a selection from the given choices, the algorithm selects the single subject category identifier (16). It is also possible that the algorithm not find a subject category identifier (7, 8) in either the exact match table or the alternative match table. In this case, the directory of content modules is not traversed.

Directory of Content Modules

A directory of content is maintained on the server system in a data structure such as a data tree which can be traversed (13). The content information may be stored in a variety of data structures known to one skilled in the art or methods developed in the future. An algorithmic traversal is then performed on the data structure based upon the subject category identifier generated from the query (14), in order to determine content for displaying (20). The data structure may be a data tree wherein each tree node contains pointer(s) to web content modules and each node is associated with a subject category identifier. The data tree may be hierarchically arranged so that the specificity of the web content module referenced by the node is a subset of the more general web content module referenced by the parent node. As an example, a node, associated with a subject category identifier, may be associated with mammals, and may contain a pointer to a web content module relating to mammals. The children node(s) of that node, also associated with subject category identifiers, may be associated with particular mammals, and may contain pointers to web content modules relating to those specific mammals such as dolphins or elephants. The children node(s) of the dolphin, for example, also associated with a subject category identifier, may be associated with a particular type of dolphin and may contain a pointer to a web content module relating to that particular type of dolphin. This type of data arrangement is just one method of maintaining the web content module directory. The data structure can be a collection of multiple data structures, and these data structures can be separated and/or merged. An arbitrary number of web content modules can be used in order to collectively provide content for a web page. The traversal may start at a particular node, wherein the node's number is equal to the subject category identifier generated from the query. The traversal may move up or down the data directory, depending upon how the subject category identifier was generated (15, 16, 17), in order to obtain content modules related to the query. For example, if the user input "dolphins" generated a subject category identifier from the exact match table (15), the algorithm may first use the content module referenced by the node corresponding to that subject category identifier, and then traverse down the data tree to obtain more specific content modules. If, on the other hand, the user input "dolphins" generated a subject category identifier from the alternative match table (16 or 17), the algorithm may first use the content module referenced by the node corresponding to that subject category identifier, and then traverse up the tree to obtain more general content modules. The web page is finally synthesized with the content modules obtained in the process outlined by FIG. 1.

FIG. 2 is an exemplary method diagram in accordance with one embodiment of the present invention, which illustrates by way of example a flow chart that represents a functional algorithm for generating identification numbers for associating with nodes in a data directory.

FIG. 3 discloses the resulting web page from a subject category identifier obtained from the exact match table (15) from a query for "Britney Spears". FIG. 4 discloses the resulting web page from multiple subject category identifiers obtained (11) from the alternative match table from a query for "bridge" wherein no content modules are obtained and the user is given a choice of different query options (12). FIG. 5 discloses the resulting web page from a subject category identifier obtained (16) after the user selects "Bridge on the River Kwai, The" from the interstitial page (12) represented by FIG. 4. FIG. 6 discloses the resulting web page from a single subject category identifier obtained from the alternative match table (17) from a query for "bridges". FIG. 7 discloses the resulting web page from no match (7, 8) from a query for "Ioza12". FIGS. 8-14 disclose additional details of processes for implementing the embodiment of the invention shown in FIG. 1.

We claim:

1. A method for displaying information comprising:
   generating a plurality of content modules, each content module comprising a subset of content of a web site;
   storing the content modules in a data store referenced by a content module data directory, the content module data directory arranged in a data tree hierarchy having a plurality of tree nodes, wherein each tree node comprises a pointer to a content module and each node is associated with a subject category identifier;
   receiving a query;
   determining if the query matches a subject category identifier in an exact match table;
   responsive to determining that the query matches the subject category identifier in the exact match table, retrieving a first content module referenced by a tree node associated with the subject category identifier from the exact match table, and traversing the data tree hierarchy from the matching node associated with the exact matching subject category identifier to a child node to retrieve a second content module comprising more specific content than the first content module;
   responsive to determining that the query does not match any subject category identifiers in the exact match table, determining if an alternative match exists between the query and an alternative subject category identifier in an alternative match table;
   responsive to determining that the query matches the alternative subject category identifier in the alternative match table, retrieving a first content module referenced by a tree node associated with the alternative matching subject category identifier, and traversing the data tree hierarchy from the matching node associated with the alternative matching subject category identifier to a parent node to retrieve a second content module, wherein the second content module comprises more general content than the first content module; and
   outputting said subsets of content of a web site from said first and second content modules to a display screen.

2. A method according to claim 1, wherein summaries of a plurality of retrieved web sites satisfying the search query are displayed on a first region of the display screen and said subset of content of a web site is displayed on a second region of the display screen in response to a single input from a user.

3. A method according to claim 1, wherein each tree node in the data tree hierarchy is associated with one or more key numbers linking the tree nodes to the subject category identifiers.

4. The method of claim 1, wherein the data tree hierarchy comprises a parent node referencing a parent content module that contains general content for a topic, and a child node beneath the parent node in the data tree hierarchy, the child node referencing a child content module that contains specific content for a topic.

5. The method of claim 1, wherein said first or second content modules comprise at least one of pictures, programs, charts, and tables.

6. The method of claim 1, wherein the information relating to the plurality of retrieved web sites and said subset of content of a web site from said first and second content modules are contemporaneously displayed on said display screen.

7. A computer readable storage medium comprising computer executable instructions, the instruction when executed causing an application to perform the steps of:
   generating a plurality of content modules, each content module comprising a subset of content of a web site;
   storing the content modules in a data store referenced by a content module data directory, the content module data directory arranged in a data tree hierarchy having a plurality of tree nodes, wherein each tree node comprises a pointer to a content module and each node is associated with a subject category identifier;
   receiving a query;
   determining if the query matches a subject category identifier in an exact match table;
   responsive to determining that the query matches the subject category identifier in the exact match table, retrieving a first content module referenced by a tree node associated with the subject category identifier from the exact match table, and traversing the data tree hierarchy from the matching node associated with the exact matching subject category identifier to a child node to retrieve a second content module comprising more specific content than the first content module;
   responsive to determining that the query does not match any subject category identifiers in the exact match table, determining if an alternative match exists between the query and an alternative subject category identifier in an alternative match table;
   responsive to determining that the query matches the alternative subject category identifier in the alternative match table, retrieving a first content module referenced by a tree node associated with the alternative matching subject category identifier, and traversing the data tree hierarchy from the matching node associated with the alternative matching subject category identifier to a parent node to retrieve a second content module, wherein the second content module comprises more general content than the first content module; and
   outputting said subsets of content of a web site from said first and second content modules to a display screen.

8. The computer readable storage medium of claim 7, wherein summaries of a plurality of retrieved web sites satisfying the search query is displayed on a first region of the display screen and said subset of content of a web site is displayed on a second region of the display screen in response to a single input from a user.

9. The computer readable storage medium of claim 7, wherein each tree node in the data tree hierarchy is associated with one or more key numbers linking the tree nodes to the subject category identifiers.

10. The computer readable storage medium of claim 7, wherein the data tree hierarchy comprises a parent node referencing a parent content module that contains general content for a topic, and a child node beneath the parent node in the data tree hierarchy, the child node referencing a child content module that contains specific content for a topic.

11. The computer readable storage medium of claim 7, wherein said first or second content modules comprise at least one of pictures, programs, charts, and tables.

12. The computer readable storage medium of claim 7, wherein the information relating to the plurality of retrieved web sites and said subset of content of a web site from said first and second content modules are contemporaneously displayed on said display screen.

* * * * *